Jan. 8, 1952    M. PODELL    2,581,497
ELECTRICAL TESTING DEVICE
Filed Jan. 23, 1948    2 SHEETS—SHEET 1
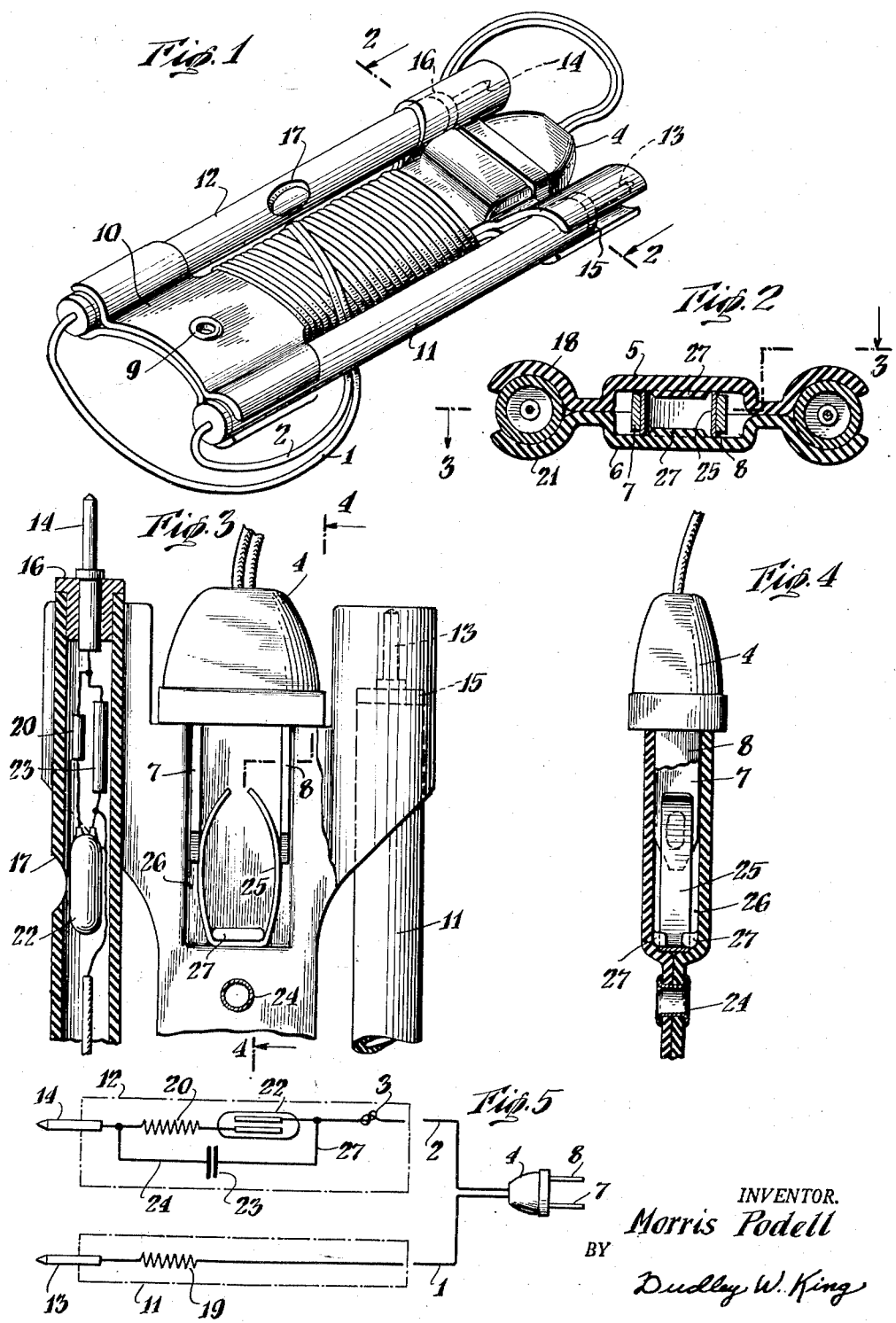
INVENTOR.
Morris Podell
BY
Dudley W. King
ATTORNEY Jan. 8, 1952     M. PODELL     2,581,497
ELECTRICAL TESTING DEVICE
Filed Jan. 23, 1948     2 SHEETS—SHEET 2
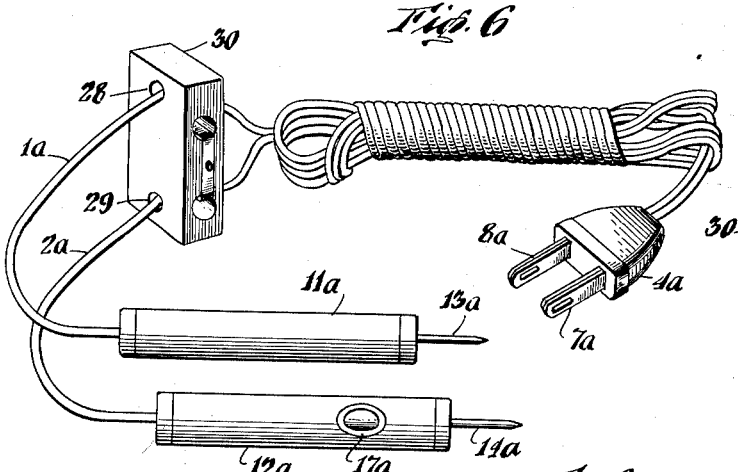
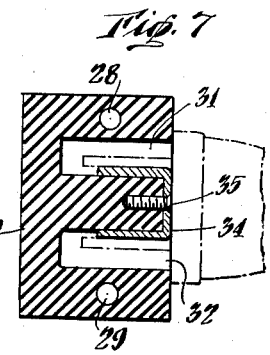
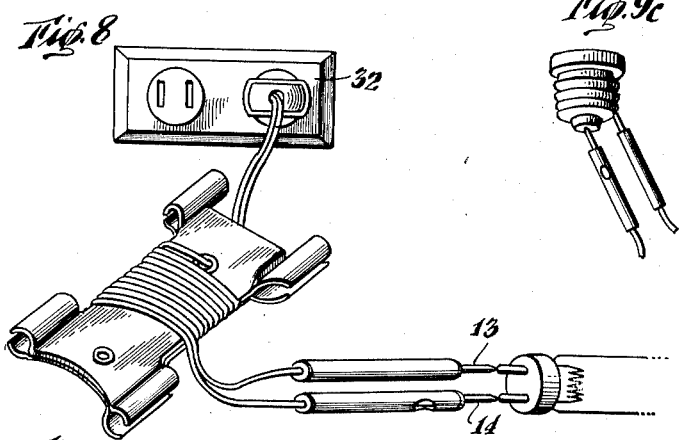
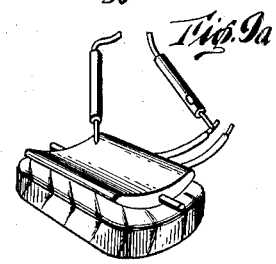
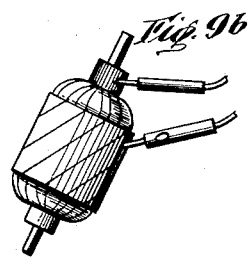
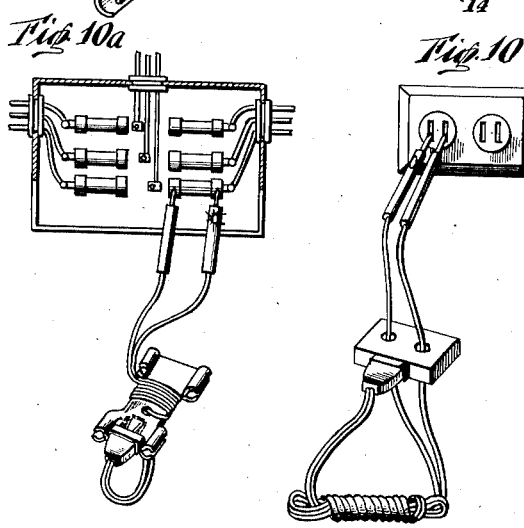
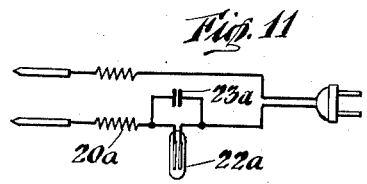
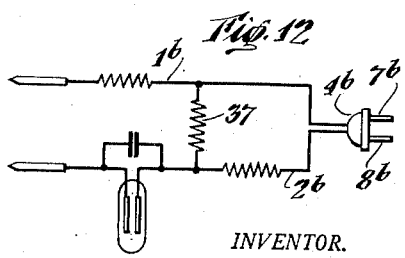
INVENTOR.
Morris Podell
BY
Dudley W. King
ATTORNEY Patented Jan. 8, 1952

2,581,497

UNITED STATES PATENT OFFICE 2,581,497

ELECTRICAL TESTING DEVICE

Morris Podell, New York, N. Y.

Application January 23, 1948, Serial No. 3,953

4 Claims. (Cl. 175—183)

The present invention relates generally to an indicating device or a testing device which may be used for testing electrical circuits or apparatus and more particularly to a portable pocket type of electrical testing device adapted to be utilized for conducting such tests as are generally referred to as "continuity" tests and "line" or circuit tests.

For some time there has existed a need for an inexpensive and compact testing device that could be utilized for making electrical tests and which would give reliable, visible indications as to the condition of the piece of equipment or circuit being tested.

Numerous electrical testing devices of the visible indicator type have been devised, but most of them have proven objectionable for various reasons. One of the most notable defects has occurred in connection with the lamp used as the visible indicator means. It is preferable to utilize test lamps of the relatively rugged and inexpensive gaseous tube electric discharge type for giving an indication of whether current is or is not flowing through a line or piece of equipment, but the use of such lamps is widely objected to by electricians, radio repair men and the like for the reason that use of such lamps is extremely deceptive. Lamps of this type, of which neon is a well known example, are very sensitive and hence they light in response to very minute currents. Frequently a neon lamp utilized in a testing device will light or illuminate even during the testing of a fuse which is actually "blown out," due to the fact that a circuit is completed through the electrician's body and the ground, instead of through the fuse. A similar situation may occur in instances where a motor coil or other piece of apparatus is being tested. A particular example of deceptive neon indications on present devices occurs when "live" wires are adjacent to dead wires in the same conduit, and the dead wires are tested. Ignition of the test lamp under such circumstances leads an electrician to believe that the particular part of the circuit or particular article is in unsatisfactory condition, when actually such may not be true. Many costly hours have been wasted in tearing down an entirely satisfactory piece of equipment in endeavoring to ascertain a possible source of trouble.

The false indications given by sensitive neon or other gaseous tube electric discharge lamps has led to a general condemnation of their use in electrical testing apparatus or devices. Most electricians refuse to purchase testing devices embodying neon indicating lamps. As a result of the foregoing drawbacks it has been necessary to use test devices which utilize much less sensitive filament type test lamps, even though the latter type of lamp is more fragile, bulkier, expensive and possesses a shorter life.

The present invention aims to overcome or minimize the above and other difficulties or disadvantages by providing a new and improved electrical indicating or testing device. The new and improved testing device may embody a gaseous tube electric discharge lamp, or neon lamp, which does not, with the new device, give false indications when used in the testing of electrical circuits, appliances or pieces of equipment. The invention further contemplates the provision of a new and improved device which may be utilized for conducting several of various types of electrical tests.

An object of the present invention is to provide a new and improved testing device.

Another object of the invention is to provide a new and improved electrical indicating or testing device incorporating visible indicator means.

Another object of the invention is to provide a new and improved electrical testing device which is adapted to give accurate indications.

Another object of the present invention is to provide an electrical testing device which may be utilized for conducting various types of electrical tests.

Still another object of the invention is to provide a new and improved electrical testing device utilizing a visible indicator of the gaseous tube electric discharge type.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a perspective view showing one form of the present invention;

Fig. 2 is a sectional view taken along the line 2—2 of Fig. 1;

Fig. 3 is a sectional view taken along the line 3—3 of Fig. 2;

Fig. 4 is a sectional view taken along the line 4—4 of Fig. 3;

Fig. 5 is a diagrammatic view showing one form of electrical hook-up for the device illustrated in Figs. 1 through 4;

Fig. 6 is a perspective view showing another form of the invention;

Fig. 7 is a sectional view showing a detail of the device illustrated in Fig. 6;

Fig. 8 is a view showing the device of the present invention being utilized for conducting a continuity test;

Figs. 9a, 9b, and 9c illustrate, in a general way, the present device used for conducting continuity tests with various appliances or pieces of equipment including some of inductive or capacity characteristics;

Figs. 10a and 10b illustrate the present device utilized to conduct circuit or line tests;

Fig. 11 is a diagrammatic view showing another form of electrical hook-up which may be used with the devices of Figs. 1 through 10; and Fig. 12 is a diagrammatic view showing a further form of electrical hook-up which may be used.

Referring more particularly to Figs. 1 through 5, there is shown one form of the present electrical testing device. As shown in these figures the device comprises a plurality of conductors 1 and 2, adjacent one end of each of which is secured an attachment plug 4 having prongs or terminals 7 and 8 projecting therefrom; the prongs 7 and 8 are adapted to make contact with leads of a suitable current supply line. The conductors or wires 1 and 2 may be of any suitable length.

A portion of the conductors will generally extend around the body portion 10 of the device (Fig. 1) and through one or more openings 9 (Fig. 1) of the body portion 10. The opposite ends of the conductors or wires 1 and 2 are shown extending into handle portions 11 and 12, each of the handle portions being provided with a conducting test prong or pin 13 and 14. The testing prongs may be assembled with end caps 15 and 16 and the latter may be fitted firmly into the ends of the handle portions 11 and 12. The handles 11 and 12 preferably have a tubular form, which is convenient to hold, and are comprised of some suitable insulating material so that a user may grasp the handles and conduct various tests with minimum possibility of accidentally receiving electrical shocks.

One of the handle portions is shown provided with a window or opening 17 in a wall thereof through which an interiorly disposed gaseous tube electric discharge lamp 22 may be viewed. The interior construction of the handles is shown diagrammatically in Fig. 5 of the drawings.

In Fig. 5 one of the wires or conductors 1 is shown connected with a resistance 19, of suitable value, and the resistance is connected at its opposite end with a test prong 13. The other wire or conductor 2 connects with a test prong 14 through a suitable resistance 20 and a lamp 22 of the gaseous tube electric discharge type. A neon lamp will generally be used as they are readily available and are comparatively inexpensive to purchase; the lamp is preferably of such size as to fit closely within the tubular handle portion 12 adjacent the cut outs or openings 17 so that one looking into the opening 17 may readily determine whether or not the lamp 22 is illuminated or giving off a glow.

It will be noted in Fig. 5 that the lamp is shown coupled or connected in parallel with a capacitance or condenser 23, the latter being likewise located within a handle portion 12 and coupled around both the resistance 20 and lamp 22. It has been discovered that coupling the condenser or capacitance in parallel with the gaseous tube lamp 20 brings about an entirely unusual result by providing a neon lamp testing device which gives accurate indications of the electrical condition of a circuit or piece of apparatus being tested. This very important feature will be further discussed hereinafter.

The wires or conductors 1 and 2 may be prevented from normally pulling away from the handle portions 11 and 12 in any suitable manner, for example, by providing them with suitable clamps or by forming a knotted portion 3 within the handle portion adjacent an end cap through which the wires extend.

When not being used for test purposes the test handle portions 11 and 12 may be retained in recesses formed or provided at opposite sides of the body portion 10 of the device (Figs. 1 through 5). An efficient and satisfactory body portion may be provided by forming opposite halves 18 and 21 from some synthetic molding material, the separately formed halves being maintained together by one or more grommets or the like 24. By forming the separate halves to provide complementary retaining recesses adjacent their outer edges, the outer edges thereof may normally remain spaced apart by a sufficient amount to allow springing the parts to allow for moving the test handle portions 11 and 12 in and out between them. The natural resilience of the material comprising the body portion 10 is such as to effectively retain the test handle portions 11 and 12 assembled with the body portion 10, yet the test handle portions may be readily removed by pulling them outwardly with respect to the body portion.

Preferably the over all length of the handle portions and test prongs is such that when they are assembled or snapped between the retaining recesses, the ends of the test prongs are contained within the resulting housing. In this way the prongs are not likely to accidentally injure a user who is carrying the device in his pocket.

One end of the body portion 10 is shown widened or formed to provide a recess 26, and a U-shaped strip of conducting material is fitted into and retained by the opposite halves of the body portion 10. The opposite halves may frictionally grip the conducting strip or may be formed with a retaining ledge 27 to more positively retain the U-shaped conducting strip assembled with the body portion 10. When the prongs 7 and 8 of an attachment plug 4 are fitted into the recess 26 between spaced leg portions of the conducting member 25, the test device may be utilized, for making "line" or "circuit" tests as herein described. Also, with the attachment plug in this position and the holding members 11 and 12 retained by the side edge portions of the body 10 the device may be conveniently carried in a pocket.

The test device shown in Fig. 6 is generally similar to that of Figs. 1 through 5 and comprises a plurality of conductors 1a and 2a to which is secured an attachment plug 4a, the plug having terminals 7a and 8a for making contact with a source of current supply. The conductors are shown coiled together and may be of any suitable length, with separate wires 1a and 2a passing through openings 28 and 29 of a non-conducting block-like member 30 so as to retain the block member with the wires at all times. The block 30 is also provided with recesses 31 and 32 (Fig. 7) into which extend the ends of a U-shaped conducting member 34 secured by a screw 35.

The device of Fig. 6 is provided with handle portions 11a and 12a similar to the form described in Figs. 1 through 5 and likewise is provided with test prongs 13a and 14a and cutouts or openings 17a for viewing a gaseous tube lamp located within the handle portion 12a. The form of the testing device illustrated in Fig. 6 preferably includes the same electrical hook up as is indicated diagrammatically in Fig. 5.

When the testing device of Figs. 1 through 6 is utilized for testing a piece of equipment such as a fluorescent lamp, fuse, motor coil, or the like (Figs. 8, 9a, 9b, 9c), the attachment plug 4 or 4a may be inserted into a suitable wall receptacle 32 in order to supply current to the test prongs 13 and 14 or 13a and 14a. When the test prongs are applied across the piece of equipment being tested, in the manner indicated generally in Figs. 8 and 9, the neon lamp will light or glow, providing there is a continuous path through the piece of equipment being tested. That is, if there is a continuous path or a continuity condition existing the lamp will glow and indicate the satisfactory or unsatisfactory condition as the case may be, of the particular piece of equipment being tested. In the event the piece of equipment is defective the lamp will so indicate and the electrician immediately knows the source of trouble. In conducting tests such as are shown in Figs. 8 and 9 the device of Figs. 1 through 6 is used as a "continuity" tester. In Fig. 8 the particular form of device shown in Figs. 1 through 5 is utilized for conducting the test but this is merely illustrative as the form shown in Fig. 6 may be used in similar manner.

The resistance units shown in Fig. 5 adjacent the test prongs 13 and 14 are desirable since they limit current through the line and, by thus minimizing the possibility of excessive current passing through the testing device or the particular piece of equipment being tested, they insure against damaging the equipment. This is particularly desirable in instances where a delicate piece of equipment is being tested as it provides a protective feature which prevents the possibility of passing excessive current which might burn out the device. The resistances prevent the passage of excessive currents upon the test prong being placed into contact with the apparatus being tested. Excellent results have been obtained in actual conditions, by utilizing resistances 19 and 20 each having values of approximately 100,000 ohms.

As pointed out hereinabove, it has been discovered that when a suitable capacitance or condenser 23 is coupled in parallel with a gaseous tube electric discharge lamp 22 the lamp gives highly satisfactory and unexpected results in that false indications, seemingly due to body capacitance or the like, are eliminated or minimized. A capacitance or condenser of any suitable size may be utilized. It has been discovered that a capacitance or condenser having a value of from approximately .025 microfarad to about .035 microfarad has proven satisfactory for testing appliances or devices utilizing voltages of approximately 100 volts to 600 volts; a condenser with a capacity of approximately .03 microfarad is preferably used since it gives excellent results in this voltage range with 60 cycle alternating current. A condenser of this approximate capacity is thus adapted to facilitate the conducting of various kinds of tests of a relatively wide range of voltages. There is thus provided a widely useful testing device which gives accurate visible indications of the condition of a particular piece of equipment being tested.

A lamp 22 of the neon variety having a "rating" of 1/25 watt gives good results, but other suitable types and ratings of lamps may be used.

In Figs. 10a and 10b the present device is shown as utilized for the conducting of what are referred to as line or circuit tests. That is, the device is being utilized to determine whether the particular line or circuit is "alive." When utilized in this manner the prongs 7 and 8 of the attachment plug 4 are fitted into the recess 26 of the test appliance illustrated in Figs. 1–5, or into the spaced apertures 31 and 32 of the block-like member 30 forming part of the test appliance illustrated more particularly in Fig. 6. When the test prongs 7 and 8 or 7a and 8a are thus inserted they are placed into contact with a contact bar or member 25 or 34. As shown in Fig. 3 the contact member is of substantially U-shape with the legs being normally urged inwardly to readily make contact with the prongs 7 and 8 of an attachment plug 4.

With a closed circuit thus formed across the prongs of an attachment plug, the test prongs 13 and 14 or 13a and 14a may be placed into contact with the two points between which it is desirable to conduct the test. If the circuit across the two particular points is "alive" the lamp will glow and if there is no current the lamp will remain unlighted.

In the form of the invention illustrated in Fig. 11 the condenser 23a is shown coupled around or in parallel with only the neon type test lamp 22a, rather than in parallel with both a lamp and a resistance. The hook-up of Fig. 5 is preferred however since it has been found to give enhanced results in actual operation.

Fig. 12 illustrates a modified form of the invention wherein an additional resistance 37 is connected across the conductors 1b and 2b. This feature is useful in that it eliminates the necessity of removing the attachment plug 4b from a receptacle or socket and reversing and reinserting it therein to insure that the correct polarity is effective with a piece of equipment being tested in a particular type of testing. The inclusion of the resistance 37 in the present test device provides for correct indications by a test lamp regardless of how the test prongs 7b and 8b are inserted into the receiving openings of receptacle with respect to the polarity of conductors connected with receptacle contacts or terminals.

While the test device feature of the gaseous tube electric discharge lamp coupled in parallel with a capacitance has been described more particularly with reference to its use with the form of test device shown in Figs. 1 and 6, it will be clear that this highly advantageous feature may be embodied in test devices of modified forms; it may, for example, be used with one leg of multipurpose "test pliers" used by electricians and radio repair men.

It will be seen that the present invention provides a new and improved electrical testing device which may be used for performing either continuity or circuit tests. The same testing device may be utilized for performing either of the tests.

Elimination of the usual filament type indicating lamp heretofore generally utilized in testing devices is a very desirable improvement. The filament type of lamp is more expensive, is more fragile and hence subject to frequent breakage and, due to the relatively high current required to visibly light the lamp, is not adapted to conducting tests of equipment utilizing relatively small quantities of current. The discovery that false or deceptive indications given by a neon type of lamp may be eliminated by coupling the capacitance or condenser in parallel with the neon type of lamp renders commercially practicable and satisfactory a testing device embodying the neon type of lamp. Electricians, radio repair men and the like may use the present device in conducting tests on electrical apparatus and circuits without obtaining the highly objectionable and extremely false or deceptive indications heretofore existant in testing devices which attempted to utilize neon lamps to give visible indications.

The present invention provides a small and compact testing device which may be carried in the pocket of a user and which may be used for conducting tests of either the continuity or the circuit type; the identical device is capable of performing either of these tests.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A testing device of the class described comprising the combination of a plurality of conductors each having a test prong connected with one end thereof and a contact terminal connected with another end thereof, a resistance unit in series with each of said conductors adjacent said test prongs, a gaseous tube electric discharge lamp in series with one of said conductors and its resistance unit, a capacitance coupled in parallel with both said lamp and the resistance unit which is in series therewith, holder members secured to said test prongs with one holder member carrying the resistance unit and lamp and condenser of one conductor and with another holder member carrying the resistance unit of another conductor, means attached with said conductors having yieldable members for releasably retaining said holder members, and a contact bar carried by said means adapted to electrically connect together said contact terminals.

2. A testing device of the class described comprising the combination of a plurality of conductors each having a test prong connected with one end thereof and a contact terminal of an attachment plug connected with another end thereof, a resistance unit in series with each of said conductors adjacent said test prongs, a gaseous tube electric discharge lamp in series with one of said conductors and its resistance unit, a capacitance coupled in parallel with both said lamp and the resistance unit which is in series therewith, holder members secured to said test prongs with one holder member enclosing the resistance unit and lamp and condenser of one conductor and with another holder member enclosing the resistance unit of another conductor, means attached with said conductors having yieldable wall portions for releasably retaining said holder members, and a contact bar secured to said means adapted to electrically connect together said contact terminals of the attachment plug.

3. A testing device of the class described comprising the combination of a plurality of conductors each having a test prong connected with one end thereof and a contact terminal of an attachment plug connected with another end thereof, a resistance unit in series with each of said conductors adjacent said test prongs, a gaseous tube electric discharge lamp in series with one of said conductors and its resistance unit, a capacitance coupled in parallel with both said lamp and the resistance unit which is in series therewith, holder members secured to said test prongs with one holder member enclosing the resistance unit and lamp and condenser of one conductor and with another holder member enclosing the resistance unit of another conductor, means attached with said conductors having spaced yieldable wall portions for releasably retaining said holder members and having a reduced portion for winding said conductors thereabout, and a contact bar secured to said means adapted to electrically connect together said contact terminals of the attachment plug.

4. A device as claimed in claim 2 in which said contact bar is contained in a recess of the first means and in which said yieldable wall portions extend along opposite sides of said recess.

MORRIS PODELL.

REFERENCES CITED

The following references are of record in the file of this patent:

UNITED STATES PATENTS

| Number | Name | Date |
| --- | --- | --- |
| 1,835,882 | Krippner | Dec. 8, 1931 |
| 1,936,005 | Bay | Nov. 21, 1933 |
| 1,973,870 | Herbert | Sept. 18, 1934 |
| 1,984,489 | Mutsaers | Dec. 18, 1934 |
| 1,986,414 | Saunders | Jan. 1, 1935 |
| 2,023,916 | Dante | Dec. 10, 1935 |
| 2,167,209 | Huskey | July 25, 1939 |
| 2,290,760 | Mehaffie | July 21, 1942 |
| 2,323,931 | Peters | July 13, 1943 |

FOREIGN PATENTS

| Number | Country | Date |
| --- | --- | --- |
| 383,504 | Germany | Oct. 13, 1923 |